US010006719B2

(12) United States Patent
Telgen et al.

(10) Patent No.: US 10,006,719 B2
(45) Date of Patent: Jun. 26, 2018

(54) TUBE BUNDLE HEAT EXCHANGER HAVING STRAIGHT-TUBE CONFIGURATION, PROCESS GAS COOLER, COOLER FOR GAS TURBINE COOLING AIR, GAS TURBINE OR GAS AND STEAM TURBINE POWER PLANT, AND METHOD FOR THE COOLING OF COOLING AIR

(71) Applicant: Balcke-Dürr GmbH, Ratingen (DE)

(72) Inventors: Thomas Telgen, Ratingen (DE); Tim Staggenborg, Ratingen (DE); Jens Blossey, Recklinghausen (DE); Dirk Band, Hannover (DE); Ricardo Fiorenzano de Albuquerque, Recife—PE (BR); Igor Ivanov, Essen (DE); Wolfgang Hegner, Bottrop (DE)

(73) Assignee: Balcke-Durr GmbH, Ratingen (DE)

( * ) Notice: Subject to any disclaimer, the term of this patent is extended or adjusted under 35 U.S.C. 154(b) by 510 days.

(21) Appl. No.: 14/565,174

(22) Filed: Dec. 9, 2014

(65) Prior Publication Data

US 2015/0159956 A1 Jun. 11, 2015

(30) Foreign Application Priority Data

Dec. 9, 2013 (EP) .................................... 13005713

(51) Int. Cl.
*F28D 1/053* (2006.01)
*F28F 9/02* (2006.01)
(Continued)

(52) U.S. Cl.
CPC .......... *F28D 1/05316* (2013.01); *F02C 7/141* (2013.01); *F28D 7/16* (2013.01);
(Continued)

(58) Field of Classification Search
CPC ................... F28D 1/05316; F28D 7/16; F28D 2021/0026; F02C 7/141; F28F 9/0229; F28F 19/002; F28F 9/167; F28F 2265/10
(Continued)

(56) References Cited

U.S. PATENT DOCUMENTS

| 1,714,703 | A | * | 5/1929 | Walton | ................... | F16L 41/001 |
| | | | | | | 165/173 |
| 2,449,616 | A | * | 9/1948 | Pennella | .................. | F28F 11/02 |
| | | | | | | 165/173 |

(Continued)

FOREIGN PATENT DOCUMENTS

| DE | 1958566 A1 | 6/1970 |
| DE | 3022480 A1 | 1/1982 |

(Continued)

OTHER PUBLICATIONS

Search Report for European Patent Application No. 13 005 713.6, dated May 21, 2014.
(Continued)

*Primary Examiner* — Jason T Newton
(74) *Attorney, Agent, or Firm* — Baker & Hostetler LLP

(57) ABSTRACT

A tube bundle heat exchanger having a straight-tube configuration, comprising a pressure vessel, a straight-tube bundle comprising a number of straight tubes which are arranged so as to be guided through an inlet tubesheet and an outlet tubesheet and to extend through the interior space of the pressure vessel. A cooler for gas turbine cooling air comprising a tube bundle heat exchanger, a gas turbine power plant and a gas and steam turbine power plant comprising a cooler for gas turbine cooling air according to the invention, as well as a process gas cooler and a method for the cooling of cooling air using such a cooler for gas turbine cooling air.

12 Claims, 4 Drawing Sheets

(51) Int. Cl.
   *F28F 9/16* (2006.01)
   *F28F 19/00* (2006.01)
   *F02C 7/141* (2006.01)
   *F28D 7/16* (2006.01)
   *F28D 21/00* (2006.01)

(52) U.S. Cl.
   CPC ............ *F28F 9/0229* (2013.01); *F28F 9/167* (2013.01); *F28F 19/002* (2013.01); *F28D 2021/0026* (2013.01); *F28F 2265/10* (2013.01)

(58) Field of Classification Search
   USPC .......................................................... 60/772
   See application file for complete search history.

(56) References Cited

U.S. PATENT DOCUMENTS

| | | | | |
|---|---|---|---|---|
| 2,484,904 A * | 10/1949 | Pennella | .................. | F28F 11/02 165/178 |
| 2,620,830 A * | 12/1952 | Schultz | .................... | F28F 11/02 138/97 |
| 2,716,428 A * | 8/1955 | Pennella | .................. | F28F 11/00 138/97 |
| 2,774,575 A | 12/1956 | Hellmuth | | |
| 3,317,222 A * | 5/1967 | Maretzo | ................ | F16L 41/001 138/97 |
| 3,707,186 A * | 12/1972 | Zorrilla | ................ | F28F 19/002 165/134.1 |
| 4,191,246 A * | 3/1980 | Cassell | ................... | F22B 1/023 165/134.1 |
| 4,396,059 A * | 8/1983 | Banner | ................. | F28F 19/002 165/134.1 |
| 4,505,017 A | 3/1985 | Schukei | | |
| 4,592,577 A * | 6/1986 | Ayres | .................... | F16L 55/179 138/98 |
| 4,735,263 A * | 4/1988 | Andro | ..................... | F22B 37/18 122/406.3 |
| 4,848,645 A * | 7/1989 | Franzolini | ............ | B23K 9/0288 165/173 |
| 4,897,908 A | 2/1990 | Henriksson | | |
| 5,107,925 A * | 4/1992 | Veigel | ..................... | F28F 9/167 165/173 |
| 5,246,063 A * | 9/1993 | Fix | ........................... | F28F 21/04 165/133 |
| 5,444,971 A * | 8/1995 | Holenberger | ............ | F02C 7/04 60/728 |
| 5,474,122 A * | 12/1995 | Pierce | .................. | F28F 9/0229 165/134.1 |
| 5,790,972 A * | 8/1998 | Kohlenberger | ..... | F02B 29/0412 60/39.53 |
| 6,334,483 B1 * | 1/2002 | Berglund | .................. | C09C 1/50 165/134.1 |
| 7,574,981 B1 * | 8/2009 | Schulz | .................. | F28F 19/002 122/235.12 |
| 7,763,215 B2 * | 7/2010 | Sakai | ................... | B01J 19/0013 165/145 |
| 8,210,245 B2 * | 7/2012 | Gillessen | ................ | F28F 9/167 165/134.1 |
| 8,747,105 B2 * | 6/2014 | Nordh | .................... | F16L 21/035 138/97 |
| 9,435,481 B2 * | 9/2016 | Bienentreu | .............. | F28F 11/02 |
| 2001/0040024 A1 * | 11/2001 | Blanda, Jr. | .............. | C01C 3/022 165/134.1 |
| 2001/0042613 A1 * | 11/2001 | Berglund | .............. | F28F 9/0236 165/82 |
| 2005/0040023 A1 | 2/2005 | Hino et al. | | |
| 2008/0283230 A1 | 11/2008 | Inatomi et al. | | |
| 2010/0294470 A1 * | 11/2010 | Creed | ................... | F28F 9/0229 165/135 |

FOREIGN PATENT DOCUMENTS

| | | | |
|---|---|---|---|
| DE | 19548688 A1 | 6/1997 | |
| EP | 0777098 A2 | 6/1997 | |
| EP | 1065467 A2 | 1/2001 | |
| EP | 1995543 A1 | 11/2008 | |
| GB | 2266951 A | 11/1993 | |
| GB | 2492943 A | 1/2013 | |
| JP | 57058084 | 4/1982 | |
| JP | S6050381 U | 4/1985 | |
| JP | S62107286 U | 7/1987 | |
| JP | H06501236 A | 2/1994 | |
| JP | 07318285 A | 12/1995 | |
| JP | H08291996 A | 11/1996 | |
| JP | H09292195 A | 11/1997 | |
| JP | 9329393 A | 12/1997 | |
| JP | 2001296090 A | 10/2001 | |
| JP | 2003-222498 A | 8/2003 | |
| JP | 2003222498 A * | 8/2003 | ............... F28D 7/16 |
| JP | 2008286437 A | 11/2008 | |
| JP | 2011-179781 A | 9/2011 | |
| JP | 2011179781 A * | 9/2011 | ............... F28F 9/18 |
| KR | 2001-0007436 A | 1/2001 | |
| WO | 9205111 A1 | 4/1992 | |
| WO | 2009066260 A1 | 5/2009 | |

OTHER PUBLICATIONS

Notice of Reasons for Rejection in Korean Patent Application No. 2014-0174816, dated Jul. 15, 2016, with English translation.

* cited by examiner

TUBE BUNDLE HEAT EXCHANGER HAVING STRAIGHT-TUBE CONFIGURATION, PROCESS GAS COOLER, COOLER FOR GAS TURBINE COOLING AIR, GAS TURBINE OR GAS AND STEAM TURBINE POWER PLANT, AND METHOD FOR THE COOLING OF COOLING AIR

CROSS-REFERENCE TO RELATED APPLICATION

This application claims priority to foreign European Application No. EP 13 005 713.6, filed on Dec. 9, 2013, the disclosure of which is incorporated by reference in its entirety.

FIELD OF THE INVENTION

This invention relates to a tube bundle heat exchanger with a straight-tube configuration, a cooler for gas turbine cooling air, a process gas cooler, a gas turbine or gas and steam turbine power plant as well as a method for the cooling of cooling air using such a cooler for gas turbine cooling air according to the independent claims.

BACKGROUND OF THE INVENTION

Heat exchangers are per se known in the art and serve to exchange heat between a heat dissipating medium which is to be cooled (hereinafter referred to as primary fluid) and a heat absorbing medium which is to be heated (hereinafter referred to as secondary fluid or "cooling fluid"), the two mediums, in heat exchangers of the type relevant in the present context, being spatially separated from each other, in particular in such a way that they do not mix. Such heat exchangers are used in connection with various industrial applications such as, for example, in a cooler as used for the cooling of gas turbine cooling air, in particular in a gas turbine power plant or a gas and steam turbine power plant, for the purpose of cooling air heated by compression (the primary fluid) and thus to improve the cooling effect in the gas turbine. Another application refers to process gas coolers in the chemical industry, for example syngas coolers in ammonia plants. Besides cooling air to be cooled, which often has temperatures of more than 400° C. and sometimes even more than 450° C. when entering the cooler for gas turbine cooling air, the secondary fluid is frequently water.

The heat exchangers used in these fields can be divided into different groups with respect to their design. One group is comprised of the so-called tube bundle heat exchangers, the basic design of which is also already known in the art. Tube bundle heat exchangers are characterized in that they comprise a plurality of tubes which are typically arranged so as to extend in parallel and in which, depending on the respective application, the primary fluid (for example air) flows in a direction of flow. At the same time, the secondary fluid flows around the outside surface of the tubes such that a heat exchange can occur between the two fluids.

Such heat exchangers further frequently comprise a pressure vessel, in particular in the shape of, for example, a hollow cylinder. The pressure vessel for example comprises an essentially hollow-cylindrical outer casing which is delimited at its face sides by an inlet tubesheet and an outlet tubesheet, which can more particularly be welded to the outer casing. A tubesheet is normally a disc-like component which carries the tubes forming the tube bundle. The term 'inlet tubesheet' designates that tubesheet through which the primary fluid passes when entering the pressure vessel on the tube side. The term 'outlet tubesheet' designates that tubesheet which is located downstream as regarded in the direction of flow of the primary fluid and through which the primary fluid passes when leaving the pressure vessel. The outer casing, the inlet tubesheet and the outlet tubesheet thus together enclose an interior space of the pressure vessel, the tubes forming the tube bundle passing through said interior space. Accordingly, the front and rear end sections of the tubes are accommodated by respective openings in the tubesheets. If the tubes are arranged so as to extend in straight lines in the longitudinal direction such that the longitudinal axis of the pressure vessel runs parallel to the longitudinal axis of the tubes, the tube bundle heat exchanger has a straight-tube configuration. This type of tube bundle heat exchangers is characterized in particular by the individual tubes running through the pressure vessel in a completely straight-lined fashion. They are thus not bent, for example, so as to follow a U-shaped pattern. The inlet tubesheet and the outlet tubesheet are consequently arranged at a distance from and opposite each other. During operation of the tube bundle heat exchanger the secondary fluid (in particular cooling water) flows through the hollow cylinder, i.e., the pressure vessel, along the outside surface of the tubes, while the primary fluid (in particular air) flows through the pressure vessel inside the tubes. This process causes the warm fluid to cool off and, due to the heat exchange, the cool fluid to be heated. For example, for purposes of dissipating heat from gas turbine cooling air, water will typically flow around the tubes, that is, around the outside surfaces of the tubes, on the casing side inside the pressure vessel. This can be done without a phase change. However, this process frequently causes the water to vaporize, resulting in an increased energy consumption due to the high vaporization enthalpy. The mass flow is thus kept small on the casing side. The generated steam can be discharged into a waste heat boiler or be used as process steam. Thus, as an alternative or a complement to the cooling fluid outlet (outlet for liquid cooling fluid), the pressure vessel may also comprise a steam outlet (outlet for vaporized cooling fluid) adjacent to the cooling fluid inlet, in particular in the case of the cooling fluid being water. The primary fluid is usually fed into the tubes via an air chamber comprising an air inlet and thence through the inlet tubesheet. A plurality of tubes of the tube bundle heat exchanger, and in particular all of them, opens into the air chamber. After passing through the tubes of the tube bundle heat exchanger, the air to be cooled leaves the tubes via the outlet tubesheet, gathering in an air chamber located downstream, from where it is then dissipated via an air outlet.

A problem found in prior art tube bundle heat exchangers is the fact that, with the tubes, more particularly their front and rear ends, normally being tightly rolled into the tubesheets, the latter suffer high thermal stress during operation. Especially due to the tubesheets typically being fixed to the casing of the hollow cylinder and high temperature gradients occurring between the cold side and the warm side of the heat exchanger in many applications such as, for example, in the case of boilers, cogeneration etc., high thermal loads act on the tubesheets, especially on the high temperature side, i.e., the side of the inlet tubesheet, where the primary fluid is fed into the straight tubes. A particular problem is the uneven heat distribution between the tubes and the tubesheet in the radial direction of the tubesheet. This may cause damage to the tubesheet material, so that the tube bundle heat exchanger may lose its operability. Further, as regards the design of a generic tube bundle heat exchanger, in particular for use in a cooler for gas turbine cooling air, account must be taken of the indispensability of stainless materials due to high cleanliness requirements with respect to the tube side of the gas turbine, i.e., the inside surface of the tubes. At the same time, however, it is necessary to sufficiently address the occurrence of high temperatures as caused by the primary fluid to be cooled, which can reach temperatures of sometimes more than 450° C., in particular in the case of gas turbine cooling air. Accordingly, the inlet section towards the inlet tubesheet as well as the tubes in this section should be resistant to temperatures of approx. 500° C. and up to550° C. For reasons of cost efficiency, the pressure vessel is normally made of an unalloyed pressure vessel steel of the type specified in particular in the DIN EN (Deutsches Institut fuer Normung—German Institute for Standardization; Europaeische Norm—European standard) 10028 family of standards. During operation, the cooling air to be cooled heats the components located in the inlet section of the tube bundle heat exchanger, such as for example the chamber upstream of the inlet tubesheet as well as the tubesheet itself, relatively to the casing of the pressure vessel, to a considerable extent. This results in temperature differences of up to 200 K in this area, which in turn cause high stress and deformation. For this reason, a so-called casing compensator is necessary for the purpose of compensating for the temperature-induced changes in length, in particular in the case of straight-tube configurations facing considerable temperature differences between the tube side and the casing side and/or in the case of material combinations comprising austenitic heat exchanger tubes and a ferritic casing with deviating coefficients of expansion. Such casing compensators are disadvantageous in that they are relatively expensive and require high maintenance. Among other things, their welding seams and moving parts frequently make them an additional weak point and a source of leakage. Moreover, friction forces from the saddles of the floating bearings as well as tube forces cannot be transferred by the casing but only by the heat exchanger tubes. This means heavy loads acting on the elements connecting the tube with the tubesheet. In addition, customers frequently demand systems, for example coolers for gas turbine cooling air, which dispense with such casing compensators.

Furthermore, when chloride containing mediums are used on the casing side, some tube materials are apt to suffer so-called stress corrosion cracking (SCC). This phenomenon predominantly occurs at the connections between the tubes and the tube sheet, where chlorides may collect in the gaps. The stress forces required for this result from thermal expansion and deformation of the structure. SCC may cause damage very rapidly, even within days. The austenitic tube material that is frequently used for the tubes in generic heat exchanges having a straight-tube configuration (in particular 1.4301 or 1.4306 in accordance with DIN EN 10088-1:2005, or TP304 or TP304L in accordance with ASTM or ASME) often lacks sufficient resistance to SCC. Water is vaporized on the casing side of the pressure vessel, resulting in an undesired concentration of chlorides in this area. Said chlorides collect in the gap between the tube and the tubesheet. Failure of a cooler for cooling air can shut down a complete gas power plant as long as it is under repair.

SUMMARY OF THE INVENTION

An aspect of the present invention is therefore to provide a design of a tube bundle heat exchanger, in particular for a cooler for gas turbine cooling air or a process gas cooler, which obviates, or at least considerably reduces, high thermal stress at the tubesheet and can therefore dispense with a casing compensator, while simultaneously preventing, or at least delaying, the occurrence of SCC.

The aspect may be achieved by a tube bundle heat exchanger having a straight-tube configuration, a cooler for gas turbine cooling air, a process gas cooler, a gas or gas and steam turbine power plant and a method for the cooling of cooling air using such a cooler for cooling air according to the independent claims. Advantageous embodiments are described in the dependent claims.

A basic concept of some embodiments resides in the fact that the straight tubes of the tube bundle heat exchanger are made of a ferritic stainless steel. Among other things, ferritic stainless steels have the advantage that they show a significantly higher resistance to SCC. To the extent to which reference is made hereinafter to specific steel designations and characteristics of the used steels, these are used primarily in accordance with the definitions and concepts specified in the DIN EN 10088-1:2005, DIN EN 10020:2000, DIN EN 10027-1:2005 and DIN EN 10027-2:1992 standards. Accordingly, the expression 'stainless steels' is meant to comprise steel grades having a mass fraction of at least 10.5% of chrome and not more than 1.2% of carbon. Additionally, reference is hereinafter made to steel designations as specified by ASME standards. Of the general group of known ferritic stainless steels, the following steels have been found to be particularly preferable: 1.4509(DIN EN 10088-1:2005), 1.4510 (DIN EN 10088-1:2005), 1.4511 (DIN EN 10088-1:2005), 1.4512 (DIN EN 10088-1:2005), 1.4513 (DIN EN 10088-1:2005), 1.4520 (DIN EN 10088-1:2005), 1.4521 (DIN EN 10088-1:2005), 1.4607 (prEN 10088-2011), TP409 (ASME), TP439 (ASME) and TP444 (ASME), the steel material designated by 1.4510 being most preferable. Another essential advantage of these ferritic stainless steels resides in the fact that they have a coefficient of thermal expansion $[K^{-1}]$ which is smaller than the coefficient of thermal expansion $[K^{-1}]$ of the pressure vessel casing, which is preferably made of an unalloyed steel. "Unalloyed steels", or "non-alloyed steels", are defined and specified in DIN EN 10020:2000 under item 3.2.1. To the extent of the disclosure of the present invention, this definition is incorporated herein by reference. Steel grades that are particularly preferable for the manufacture of the outer casing of the pressure vessel are in particular the following: P355NH (DIN EN 10028-3), 15NiCuMoNb5-6-4 (DIN EN 10028-2), 20MnMoNi4-5 (DIN EN 10028 -2), 13CrMo4-5 (DIN EN 10028-2) 10CrMo9-10 (DIN EN 10028-2), SA-516-Gr.71 (ASME), SA-302-Gr. B (ASME) or SA-533-GR. B (ASME). This particular material combination of "ferritic stainless" steels for the straight tubes and "unalloyed steels" for the pressure vessel casing has the advantage that temperature-induced changes in length are virtually compensated for during operation. Overall, in the case of such design and materials it is even possible to completely dispense with a casing compensator.

A fact that is important to consider in this regard is that ferritic steel tube materials can normally be used only at temperatures of up to 430° C. However, in a plurality of applications the temperature of the primary fluid entering the tubes in the area of the tubesheet is higher, which is why customer's specifications often have higher inlet temperatures of the primary fluid with respect to the temperature tolerance of the tube bundle heat exchanger according to the invention. This applies for example to cooling air to be cooled in a cooling air circuit of a gas turbine. Here, the air guided to the cooler for cooling purposes (primary fluid)

often has an inlet temperature of more than 470° C. in the region of the inlet tubesheet. A conventional approach would be to configure the complete tube side (i.e., the tubes, the tubesheet and the chambers) for the maximum possible operating temperature (admissible temperature). However, as the straight tubes according to the invention made of ferritic stainless steel would not be admissible in this temperature range, their use is only possible if the admissible temperature of the tubes is reduced. According to the existing systems of international rules such as, for example, EN 13445 and ASME Div. 8 Sec. 1&2, the admissible temperature of the tubes may be reduced only if permanent cooling of the tube is ensured during operation. This is possible without problems for those sections of the straight tubes located inside the pressure vessel as they are permanently exposed to the cooling medium, preferably water, flowing around them. In particular in the case of the fluid to be cooled being heated air and the cooling fluid being water, the temperature of the tube surfaces is close to the temperature of the liquid medium due to the heat transfer ratios. Therefore, in terms of system configuration, it must merely be ensured that the casing side of the tubes is covered with water during operation. This can for example be done using known sensor and control systems. Those sections of the straight tubes which are not in direct contact with the cooling fluid (secondary fluid), however, may be particular in this regard. This specifically concerns the straight tube sections which are located within the inlet tubesheet and are therefore not surrounded by the cooling medium. Therefore, in order to achieve the desired performance, provision is further made for arranging a thermal insulation device inside at least one straight tube and in particular in all of the number of ferritic stainless steel made straight tubes of the tube bundle heat exchanger, in addition to the choice of materials as described above in particular with respect to the straight tubes. This way, it is possible to also use the "ferritic stainless" steels according to the invention to cool fluids having temperatures of more than 470° C. up to a maximum of preferably 550° C. with the tube bundle heat exchanger according to the invention even though the straight tubes made of "ferritic stainless steel" may normally be exposed to maximum temperatures of only 430° C. In terms of construction, therefore, a further aspect of the invention is the fact that, in addition to the combination of materials as described above, a respective thermal insulation device is arranged inside at least one straight tube and in particular in all of the number of ferritic stainless steel made straight tubes of the tube bundle heat exchanger at least in the section corresponding to the level of the inlet tubesheet. The basic task of the thermal insulation device is to reduce the heat transfer from the primary fluid to be cooled in particular to the straight tubes in the inlet area. By this, even the straight tube sections that are not enclosed by water will be protected against undesirably high temperature stress. Accordingly, the thermal insulation device according to the invention is designed such that it thermally insulates the straight tubes to the outside in the area of the inlet tubesheet, i.e., in particular in those sections in which the inlet tubesheet is adjacent to the respective straight tube in the radial direction relative to the longitudinal axis of the straight tube, so that the radial heat transfer between the primary fluid flowing into the straight tubes and the tubes, and thus also between the tubes and the tubesheet, is significantly reduced in this area. The essential aspect, therefore, is the protection of the inside surface of the straight tube against the primary fluid flowing through it by the thermal insulation device at least in the area of the tubesheet. Accordingly, the thermal insulation device is arranged inside the straight tube particularly in this section and thus in particular completely prevents the fluid to be cooled flowing into the tubes from making direct physical contact with the inside surface of the straight tube. This results not only in the tubes being protected against overheating caused by the primary fluid to be cooled flowing through them but also in a much more homogenous, and, in terms of overall temperature level, lower temperature distribution.

The specific structure and design of the thermal insulation device may vary, provided that it is ensured that it has the above described effect, in particular the thermal insulation effect between the primary fluid flowing into the tubes and the straight tube itself in the section corresponding to the level of the inlet tubesheet for the purpose of thermal relief of the straight tube in the section lying within the tubesheet by the thermal insulation device. It has turned out to be particularly advantageous to design the thermal insulation device such that it comprises a ferrule (or bushing, respectively) which is arranged at least in that section that corresponds to the level of the inlet tubesheet and which is inserted in the straight tube from the inlet side of the primary fluid. Being arranged inside at least one and preferably inside all straight tubes, the ferrule can either itself act as a thermal insulator in the radial direction or it can act as a carrier for an insulator in this area for the purpose of preventing, or at least reducing, a radial heat transfer between the fluid flowing into the tubes and the tubes, and subsequently between the tubes and the tubesheet. Thermal stress is thus effectively prevented or at least significantly reduced in the tubesheet, so that no damage is caused to the tubesheet, and the tube bundle heat exchanger in particular maintains its operability even in case of relatively drastic temperature differences (for example exceeding 200 K) between the primary fluid and the secondary fluid, especially in the inlet area of the tubesheet. The ferrule is thus arranged in such a manner that it is inserted in the at least one straight tube in at least the section extending through the tubesheet, however an arrangement in which the ferrule extending inside the tube protrudes from the area of the tubesheet in the longitudinal direction of the tube towards one or both sides of the tubesheet is obviously also possible. Accordingly, the fluid guided through the tubes will not directly flow along the inside surfaces of the tubes in this area but through the ferrule positioned inside the tubes and/or through the insulator carried by the ferrule. In this area, the fluid is thus guided at a distance from the inside surface of the tube in the radial direction by means of the ferrule and/or the insulator carried by the ferrule, so that a radial heat transfer from inside the tube towards the tubesheet is reduced or even essentially prevented. Thermal stress acting on the tubesheet is therefore reduced in an efficient and, in terms of construction, comparably simple manner. Moreover, the invention is extremely well-suited for retrofitting already existing systems, in which case the ferrules need to be designed such that they can be inserted in the tubes through the tube end up to the level of the tubesheet and subsequently be fixed in this position. 'Radial direction' in this context refers to the direction transverse to the longitudinal center line of the respective straight tube.

According to a preferred embodiment, the ferrule is designed so as to be flattened towards at least one outer edge in the axial direction of the ferrule and to have an expanding inner diameter. As a result, the changes in cross-section caused by the insertion of the ferrule occur in a steady and ascent-like manner, so that rises and drops in pressure caused by abrupt changes in cross-section are reduced and a smoother flow behavior can be obtained despite the inserted ferrule. Starting from a smaller diameter, the change in cross-section of the inside surface of the ferrule ideally occurs along a, preferably uniform, slope up to an inner diameter which is nearly identical with that of the inside surface of the straight tube, to the extent possible with respect to structural integrity. Such a flattened area more preferably extends towards that outer edge of the ferrule which is located downstream.

According to another embodiment, the ferrule comprises towards at least one outer edge a stop collar protruding in the radial direction and having a stop member diameter which is larger than the inner diameter of the at least one straight tube and is in particular also larger than the inner diameter of an opening in the tubesheet for receiving the straight tube. As a result of such a design, the stop collar part of the ferrule will not fit inside the tube. This allows for relatively easy positioning and fixing of the ferrule to the tube, and constructional adjustment of the length of the ferrule and the size of the stop collar can ensure that, when in its stop position, the ferrule will reliably be positioned in the area of the inlet tubesheet. Further, the stop collar radially protruding from the tube end is suitable to serve as a base for further attachment measures, for example welded connections, if desired and required. The stop collar may also be designed in multiple tiers, for example be stepped, and thus comprise a number of sections having different outer circumferences. The progression of the steps is preferably such that the outer circumferences of the steps decrease as regarded in the flow direction of the ferrule.

It is generally possible to already manufacture the ferrule itself from a material that has a low thermal conductivity and thus acts as a thermal insulator. In general, low thermal conductivity within the meaning of the present invention is to be understood in particular as a heat conductivity of 0.05 to 0.2 W/mK at 600° C., the aforesaid range merely being explanatory and not to be understood as limiting, thus for example obviously also including lower thermal conductivity. According to this embodiment, therefore, the ferrule itself acts as a thermal heat insulator. However, the materials eligible for this in practical use such as, for example, suitable ceramic materials, are extremely expensive and complicated to handle. The ferrule is therefore preferably used in combination with an additional insulation material. The ferrule then additionally or alternatively serves primarily as a means for positioning an insulation material inside the tube. To this end, in the area between its outer edges, the ferrule for example comprises an annular recess extending on the inside jacket surface, or more preferably on the outside jacket surface, in the longitudinal or axial direction, thus forming a receiving cavity in particular between an outside jacket surface of said ferrule and the inside wall surface of said at least one straight tube. The receiving cavity thus for example has an annular, hollow cylindrical shape and is formed between the outside surface jacket of the ferrule and the inside wall surface of the tube, and is preferably delimited by corresponding side walls of the ferrule in the longitudinal direction of the ferrule. This cavity can already serve as a thermal insulator when filled with air. In the axial direction, the receiving cavity preferably extends at least throughout the entire thickness of the tubesheet or, in other words, over the entire area between the front side and the rear side of the inlet tubesheet as regarded in the direction of flow of the fluid in the straight tube.

Between its outside jacket surface and the inside wall surface of the at least one tube, in particular in the area of the receiving cavity, the ferrule preferably further comprises an insulator, or insulation body, as part of the thermal insulation device. According to this embodiment, an additional device is thus provided which is held in its position inside the tube at the level of the inlet tubesheet by means of the ferrule. Such device should generally show a low thermal conductivity. In the present context, an insulator is thus understood to be a device with good thermal insulation properties, that is with low thermal conductivity, and thus prevents, or at least significantly reduces, the heat transfer in the radial direction from inside the tube to the straight tube and thus to the tubesheet. For this purpose, the insulator can be designed as a single-piece or multi-piece component. Further, insulators consisting of a single material are in general conceivable as well as insulators consisting of a number of different materials. The essential aspect is that the insulator is, on the one hand, suitable to be held in the area of the tubesheet by the ferrule, and on the other hand reduces, or even essentially prevents, a heat transfer.

The insulator may in particular be an insulation body which is fixed inside the at least one tube in a positive and/or non-positive manner by the ferrule. Accordingly, the ferrule has mainly a positioning function, ensuring that the insulator is held at the intended position at the level of the inlet tubesheet inside the straight tube during operation. For this purpose, the ferrule is for example designed in such a manner that it is held in its position by means of frictional connection with the inside wall surface of the tube. The insulator itself may further also be implemented as a ferrule or at least as having a ferrule-like overall structure, located between the outside jacket surface of the ferrule and the inside wall surface of the tube, in particular in the receiving cavity described above, designed for example as annular recess.

The insulation body preferably consists of a material with low thermal conductivity. In this regard, the use of single or multi-layered, in particular ceramic, insulating paper has turned out to be particularly suitable. Such an insulating paper is, one the one hand, flat and therefore suitable for insertion in the area between the ferrule and the tube. On the other hand, it has favorable conductivity properties. Such an insulating paper is in particular a ceramic fiber paper comprising fireproof ceramic fibers, more preferably with a chemical composition of 45-60% of $SiO_2$ and 40-55% of $Al_2O_3$. These percentages are to be understood in particular as wt % meaning % [m/m].

With respect to its spatial conditions, the design of the insulation body is preferably adapted to the ferrule, for example in such a manner that it rests flat against the inside wall surface of the at least one tube and/or, at the same time, at least partially also against the outside jacket surface of the ferrule in a positive and/or non-positive manner. In order to obtain the maximum possible insulation effect towards the tubesheet in the radial direction, the insulation body preferably completely fills the gap between the outside jacket surface of the ferrule and the inside wall surface of the tube.

It has shown to be advantageous if the insulation body covers the inside wall surface of the at least one tube at least in that section of the straight tube that is located within the inlet tubesheet in order to block the heat transfer in the radial direction in this area and thus to effectively prevent the occurrence of thermal stress. Accordingly, the insulation body preferably covers the inside wall surface of the at least one straight tube at least in the area corresponding to the level of the inlet tubesheet. With respect to each other, the ferrule and the insulation body are designed such that at least the insulation body extends throughout the entire thickness of the tubesheet as regarded in the longitudinal direction of the tube. This also implies the possibility of the insulation body and the ferrule being designed to be much longer than is necessary in order to guarantee that in any event an insulation body is arranged inside the respective straight tube at the level of the inlet tubesheet. At the same time, however, the size and dimensions of the entirety of ferrule and insulation body are preferably kept as small as possible in order to minimize the flow resistance caused by the ferrule.

The thermal insulation device further preferably protrudes from the straight tube towards the inlet area upstream of the inlet tubesheet. According to this embodiment, the thermal insulation device thus partially protrudes from the straight tube and reduces a direct heat transfer to the inlet tubesheet in the radial direction in this area. The thermal insulation device can further also comprise an insulation collar in its inlet area, which extends circumferentially in the radial direction relative to the longitudinal axis of the straight tubes and rests on the surface of the inlet side of the inlet tubesheet or a heat shield, which will be explained in more detail below. This serves to reduce a heat transfer from the fluid frontally flowing against the inlet tubesheet.

In order to further reduce the heat exposure of in particular the inlet tubesheet, the tube bundle heat exchanger preferably comprises a heat shield upstream of the inlet tubesheet as regarded in the direction of flow of the primary fluid (which is in particular gas turbine cooling air to be cooled). The basic task of the heat shield is to protect the front face side of the inlet tubesheet, and therefore the inlet tubesheet in its entirety, against undesired heat transfer caused by the primary fluid flowing directly against it. The heat shield is positioned upstream of the inlet tubesheet as regarded in the direction of flow of the fluid to be cooled. As a result, the inlet tubesheet will have a significantly lower mean temperature during operation, since on the one hand the heat shield nearly blocks, or at least drastically reduces, the heat input from the inlet side while the inlet tubesheet is on the other hand cooled by its rear face side facing the interior of the pressure vessel. In this area, the inlet tubesheet is in direct contact with the secondary fluid, in particular water for cooling purposes. Stress, deformation and resulting damage to the inlet tubesheet can be significantly reduced in this way.

The tube bundle heat exchanger according to the invention is preferably designed such that the tube ends of the straight tubes of the tube bundle heat exchanger do not completely extend from the inlet tubesheet up to the outside surface of the heat shield (outside surface in the present context designating the surface of the heat shield facing away from the inlet tubesheet) but terminate before this, ideally within the boundaries defining the thickness of the inlet tubesheet. A thermal insulation device designed as a ferrule, which acts either as a thermal insulator by itself or as a means for attaching a thermal insulator, may preferably be designed so as to extend from the inlet area of the heat shield to the area downstream of the inlet tubesheet. According to this embodiment, the ferrule thus protrudes from the straight tube in the direction of the heat shield. This allows for positioning the straight tube at a spatial distance from the area upstream of the heat shield as regarded in the direction of flow of the primary fluid, which further contributes to reducing the heat transfer in this area.

The specific design of the heat shield itself may also vary. Normally the heat shield will have a panel-like overall shape. The heat shield preferably comprises a ceramic fiber panel which is more particularly vacuum formed. In the present context, ceramic fibers are to be understood as fibers made of an inorganic, non-metallic material. This concerns more preferably alumina or silicon carbide fiber types, and in particular also mixed fibers comprising the aforesaid fiber types. The ceramic fiber panel preferably has a chemical composition of 45-60% of $SiO_2$ and 40-55% of $Al_2O_3$. These percentages are to be understood in particular as wt%. Accordingly, the term 'ceramic fiber panel' specifically designates an entirety of ceramic fibers having a panel-like overall design, which may be implemented as a single-piece or multi-piece component. A panel-like design means that the ceramic fiber plate extends significantly farther in a plane than in a direction perpendicular to that plane. The ceramic fiber panel is ideally arranged such that its surface rests flat against the inlet tubesheet.

The heat shield preferably comprises passage openings that correspond to the straight tubes. This means that a respective passage opening in the heat shield is allocated to each of the straight tubes of the tube bundle heat exchanger. The passage openings thus provide a flow connection between the area upstream of the heat shield, as regarded in the direction of flow of the primary fluid, and the interior space of the straight tubes. Accordingly, the thermal insulation device is designed so as to extend into the respective straight tube from the side facing away from the inlet tubesheet up to the area corresponding to the level of the inlet tubesheet.

The heat shield is ideally directly attached to the inlet tubesheet. To this end, a suitable holding means is provided for the purpose of attaching the heat shield directly to the inlet tubesheet. This allows for obtaining a relatively compact design and at the same time an efficient prevention of heat transfer. For this purpose, the holding means is implemented so as to fix the ceramic fiber plate in front of the inlet tubesheet, and for this purpose in particular comprises bolt connections, holding brackets and/or retaining plates.

More specifically, the holding device may be designed so as to extend concentrically along the outer edge of the inlet tubesheet. As an alternative or a supplement to this, elements of the holding device may also be distributed over the tubesheet surface. What is essential is that the holding device allows for stable and reliable attachment of the heat shield to the outside surface of the inlet tubesheet and at the same time does not affect the flow connection to and into the tubes.

For attachment purposes use may be made, for example, of screw connections, wherein preferably retaining plates, which may be implemented as single-piece or multi-piece components, are additionally provided on the side of the heat shield facing away from the inlet tubesheet, which retaining plates prevent displacement of the heat shield, comparable to a washer. The screw connections further preferably comprise threaded stud bolts, so that a retaining plate can be fastened to the inlet tubesheet by use of said stud bolts. Another essential aspect in this regard is that the ferrules and retaining plates described above are installed as tightly as possible in order to prevent fibers loosening from the ceramic fiber elements from entering the tubes and/or the chamber.

With respect to its overall construction, the tube bundle heat exchanger is preferably designed for the cooling of gas turbine cooling air in gas turbine power plants or gas and steam turbine power plants, more particularly of cooling air to be cooled and having inlet temperatures of at least 450° C. and more particularly of at least 470° C. up to 550° C. Especially in these facilities, the tubesheets are frequently exposed to extreme thermal stress, so that the described advantageous effects will show very clearly here. Another preferred application is the utilization as a process gas cooler in chemical processes, for example in a syngas cooler of an ammonia plant.

Another aspect of the invention concerns a cooler for gas turbine cooling air comprising a tube bundle heat exchanger as described above. Such a cooler for cooling air for gas turbines according to the invention is particularly suitable for the cooling of heated gas turbine cooling air in a gas turbine power plant or a gas and steam turbine power plant. A process gas cooler comprising a tube bundle heat exchanger as described above is however also comprised in the scope of the invention.

Another aspect of the invention thus concerns a gas turbine power plant or a gas and steam turbine power plant comprising a cooler for gas turbine cooling air as described above.

Some embodiments of the invention finally further relates to a method for the cooling of heated cooling air by use of a cooler for gas turbine cooling air according to some embodiments comprising a tube bundle heat exchanger according to some embodiments, specifically in a gas turbine power plant or gas and steam turbine power plant according to some embodiments, and a method for the cooling of heated process gases using a process gas cooler according to some embodiments.

BRIEF DESCRIPTION OF THE DRAWINGS

The aspects of this disclosure are explained in detail below by reference to the exemplary embodiments shown in the drawings, wherein.

DETAILED DESCRIPTION

Figure 1:
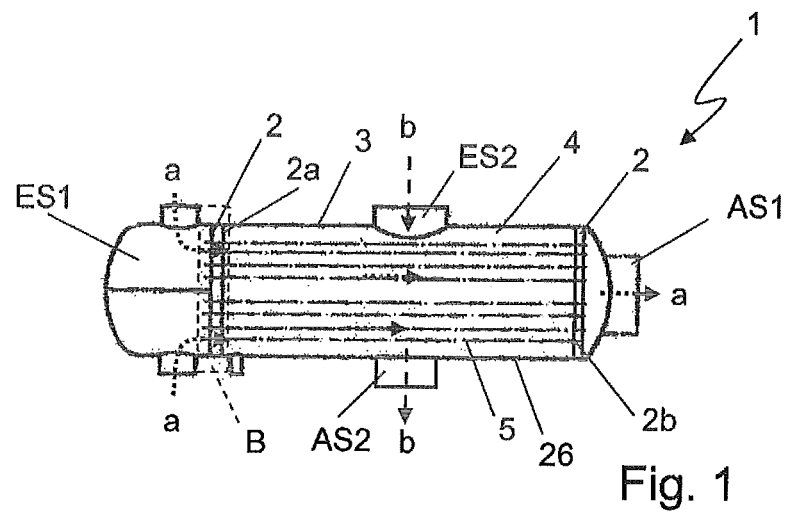
FIG. 1 is a cross-sectional view of a tube bundle heat exchanger.

Like components and components of like function are designated by like reference numerals in the drawings, although the shown embodiments may vary.

FIG. 1 shows a cross-sectional view of a tube bundle heat exchanger 1 suitable for use with an embodiment. Its basic components comprise an interior space 4 of a pressure vessel 26, which is defined by the wall of an outer casing 3, straight tubes 5 extending from an inlet side ES1 of a primary fluid to be cooled to an outlet side AS1 of said fluid, the straight tubes 5 being carried by a respective tubesheet 2 in their front and rear end sections, as well as an inlet side ES2 and an outlet side AS2 for a secondary fluid (in particular cooling water), which flows along the outside surfaces of the straight tubes 5 inside the interior space 4. The straight tubes are made of a ferritic stainless steel, in the present embodiment specifically a steel having the material number 1.4510 (in accordance with DIN EN 10088-1:2005) or TP439 (ASME). The outer casing 3 in the present embodiment consists of an unalloyed steel, in the present embodiment specifically a steel having the material number P355NH (DIN EN 10028-3). Coming from the inlet side ES1 upstream of the tubesheet 2 (this area is also referred to as prechamber or air chamber; this tubesheet is also referred to as inlet tubesheet 2a), the primary fluid (which is in particular air to be cooled) flows into the straight tubes 5 in the direction of arrow a, in which straight tubes 5 it is guided through the interior space 4 of the pressure vessel 26 and is then discharged through the further tubesheet 2 (outlet tubesheet 2b) and via the outlet area AS1. The secondary fluid (in particular water) enters the interior space 4 of the pressure vessel 26 of the tube bundle heat exchanger 1 through the second inlet side ES2 in the direction of arrow b, flows around the outside surfaces of the straight tubes 5 (which is also referred to as the casing side) and leaves the interior space 4 through the second outlet side AS2. Heat is transferred between the two fluids in the interior space 4, more specifically the primary fluid is cooled while the secondary fluid is heated.

Figure 2:
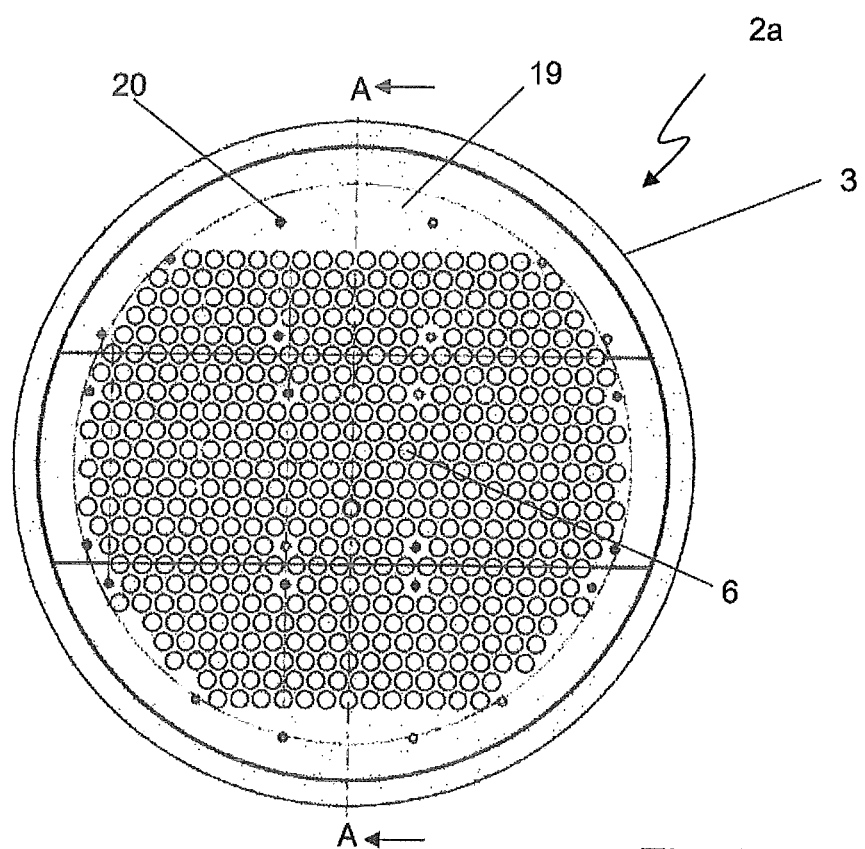
FIG. 2 Is a top view of area B shown in FIG. 1.
Figure 4:
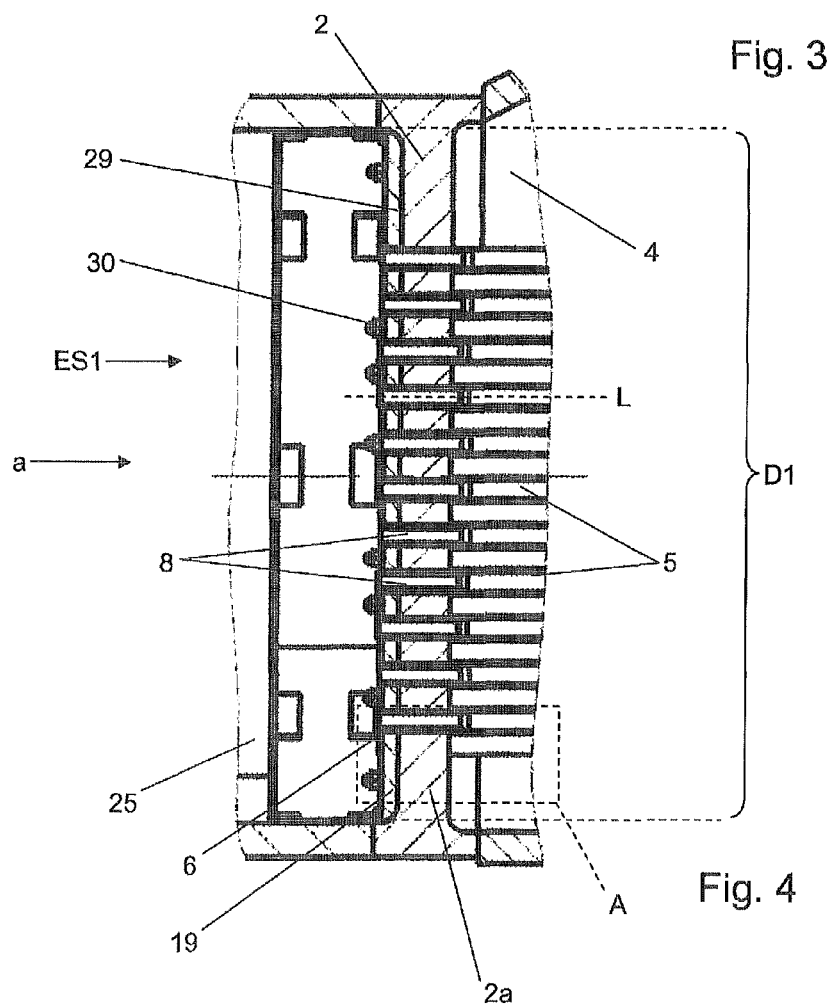
FIG. 4 is a longitudinal cross-sectional view of area B shown in FIG. 1 and FIG. 3.

FIG. 2 is a top view, as regarded in the direction of flow a of the primary fluid, of area B as indicated by the dashed frame in FIG. 1. FIG. 4 is an enlarged cross-sectional view of this area. FIG. 2 illustrates the structure of a heat shield, which is arranged upstream of the inlet tubesheet 2a as regarded in the direction of flow of the primary fluid, and will be explained in more detail below.

Figure 3:
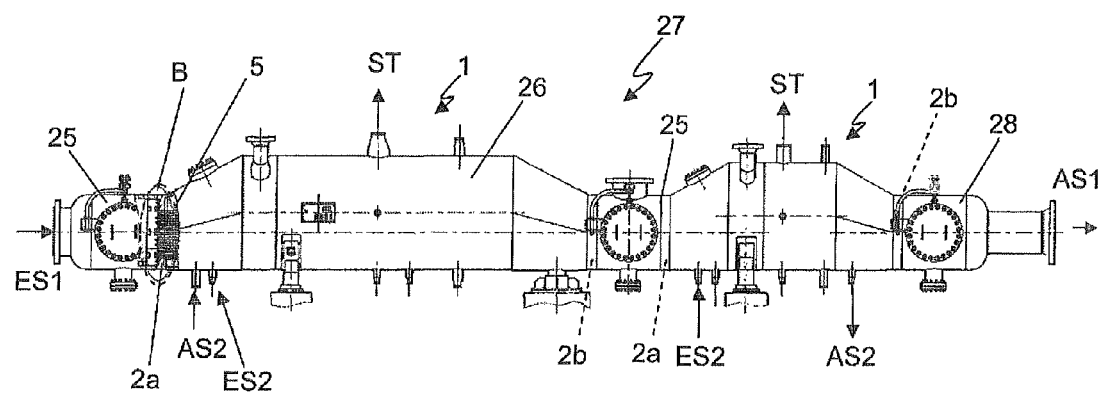
FIG. 3 is a side view of a cooler for gas turbine cooling air.

FIG. 3 schematically illustrates the design of a two-stage cooler 27 for gas turbine cooling air (or of a two-stage process gas cooler) comprising two tube bundle heat exchangers which are connected in series. The air to be cooled enters the cooler 27 for gas turbine cooling air via ES1, passes the prechamber 25 of the first tube bundle heat exchanger 1, flows against the inlet tubesheet 2a of the first tube bundle heat exchanger 1, where it is distributed over the plurality of straight tubes 5, passes the first pressure vessel 26 and flows through outlet tubesheet 2b, which is merely schematically indicated, into a second prechamber 25 of the second tube bundle heat exchanger 1. In top view, as regarded in the direction of flow of the primary fluid (the cooling air to be cooled), the tubesheet 2a corresponds to the arrangement shown in FIG. 2. In the second prechamber 25, the cooling air is for a second time distributed via the inlet tubesheet 2a (which is merely schematically indicated) of the second tube bundle heat exchanger 1, which essentially comprises the same components as the first tube bundle heat exchanger 1. The constructional measures for protection of the straight tubes 5 against heat as described below may, however, not be necessary for the second tube bundle heat exchanger 1. After leaving through the outlet tubesheet 2b, the cooled air is gathered in the air chamber 28 and is then discharged via an outlet not described in detail in the direction towards AS1, and is thereafter used for cooling a gas turbine in a gas turbine power plant (which is not shown in the drawings either). Of particular relevance for the present invention is the design of the area of the first inlet tubesheet 2a of the first tube bundle heat exchanger 1, as regarded in the direction of flow of the primary fluid. Further, the cooler 27 for gas turbine cooling air shown in FIG. 3 comprises a respective cooling water inlet ES2 and a respective cooling water outlet AS2 for each of the tube bundle heat exchangers 1. Where the tube bundle heat exchanger 1 is preferably used as an evaporator, each of the pressure vessels 26 of the tube bundle heat exchanger will comprise a respective steam outlet ST, via which the generated steam can be either disposed into waste heat boilers or be used as process steam in further applications. In that case, the outlets AS2 are not required and can be omitted, since the cooling water is completely evaporated. It is merely for the sake of clarity that FIG. 3 shows both the water outlets AS2 and the steam outlets ST.

Figure 5:
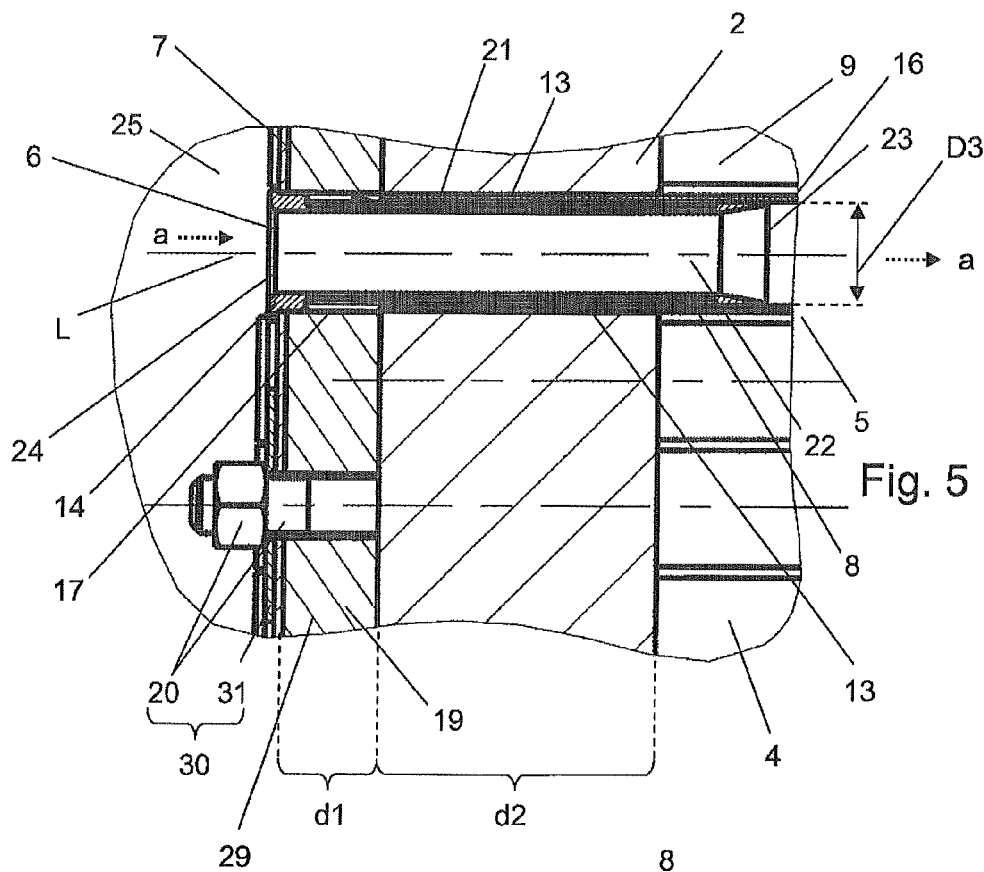
FIG. 5 is an enlarged detail view of area A shown in FIG. 4.

The tubesheets 2a and 2b and the outer wall 3 together define an interior space 4, which is passed through by a plurality of straight tubes 5, the ends of which respectively protruding into each of the tubesheets 2a and 2b. The straight tubes 5 extend in straight lines along a longitudinal axis L (FIG. 5). During operation, the primary fluid (in particular gas turbine cooling air which is to be cooled) flows through the straight tubes 5 in the direction from the inlet tubesheet 2a towards the outlet tubesheet 2b. The secondary fluid (for example water) flows through the interior space 4 defined by the hollow cylindrical outer wall 3. As a result of the two fluids having different temperatures and flowing through the tube bundle heat exchanger 1, the hot fluid (usually the primary fluid) cools off while the cool fluid (usually the secondary fluid) is heated. In order to prevent, or at least reduce, thermal stress in the tubes 5 as well as in the tubesheets 2, in particular in the inlet tubesheet 2a and in the entire cooler for gas turbine cooling air, thermal insulation devices, which more specifically are designed as ferrules, are arranged inside the straight tube ends in the area of the inlet tubesheet 2a, which thermal insulation devices are explained in more detail below with reference to FIG. 5.

FIG. 4 illustrates the design of inlet area B of the tube bundle heat exchanger 1, in particular at the level of the inlet tubesheet 2a shown in FIGS. 1 and 3. 'At the level of the inlet tubesheet 2a' in this context refers to the area within the boundaries of the thickness d2 (FIG. 5) of the inlet tubesheet 2a, as regarded in the direction of flow a. A heat shield 19 is arranged upstream of the tubesheet 2a on its front face side 7, as regarded in the direction of flow a of the primary fluid (which is for example the cooling air of the cooler for gas turbine cooling air 27 as shown in FIG. 3). This disc-like element has a thickness d1. Essential components of the heat shield 19 are a ceramic fiber panel 29 and a holding device 30, by means of which the ceramic fiber plate 29 is attached to the inlet side of the inlet tubesheet 2a. The holding means 30 comprises retaining bolts and retaining plates 31. The retaining plates 31 rest with their surfaces on the outside surface of the ceramic fiber panel 29, the retaining bolts 20 extending through both the retaining plates 31 and the ceramic fiber panel 29 and being fastened to the inlet tubesheet 2a. The ceramic fiber plate 29 thus rests directly on the outside surface, i.e., the front face, of the inlet tubesheet 2a. The heat shield 19 therefore overall constitutes a thermal protection device in particular for the front face 7 of the tubesheet 2. Accordingly, the primary fluid cannot flow directly against the outside surface of the inlet tubesheet 2a. The heat shield 19, having a diameter D1, extends over the entire surface area of the inlet tubesheet 2a, as regarded in the direction of flow a.

Ferrules 8, which are inserted in the straight tubes 5 and act as thermal insulation devices, extend through receiving openings 6 distributed over the surface of the heat shield 19 from the tubesheet 2 to the outside surface of the heat shield 19. The structure and functionality of the thermal insulation devices is explained in more detail below.

The inlet tubesheet 2a delimiting the interior space 4 of the tube bundle heat exchanger 1 is located downstream of the heat shield 19, as regarded in the direction of flow of the primary fluid. Further, the inlet tubesheet 2a extends over the entire interior space 4 of the tube bundle heat exchanger 1. The tubesheets 2 are essential supporting elements for the plurality of straight tubes 5 in their front (inlet tubesheet 2a) and rear (outlet tubesheet 2b) end regions. A plurality of passage openings 21, corresponding to the number of straight tubes 5, extend through the tubesheets 2 in a direction perpendicular to the face sides, as regarded in the direction of flow of the primary fluid, along the longitudinal axis L. A respective straight tube 5 of the tube bundle heat exchanger 1 is thus allocated to each of the passage openings 21 of the inlet tubesheet 2a, as shown by the top view in FIG. 2.

In order to reduce the temperature transfer throughout the thickness d2 of the tubesheet 2, that is, a heat transfer from the interior 22 of the straight tubes 5 in the radial direction relative to the longitudinal axis L of the passage opening 21, the thermal insulation device designed as a ferrule is arranged inside the tube, extending, as regarded in the direction of flow a, from the heat shield 19 throughout the thickness d2 of the tubesheet 2 and beyond the latter. The primary fluid is thus not in direct contact with the straight tubes 5 but guided inside the ferrules 8 when flowing through the heat shield 19 having the thickness d1 and the inlet tubesheet having the thickness d2. In this regard, the straight tubes do preferably not reach until the prechamber 25 but only extend to the area of the outside surface of the inlet tubesheet 2a covered by the heat shield.

Figure 6:
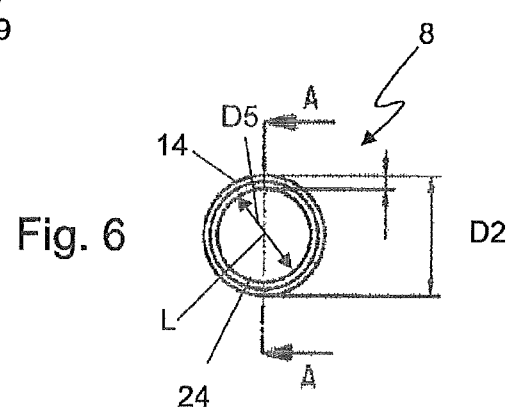
FIG. 6 is a top view of the ferrule shown in FIG. 5.
Figure 7:
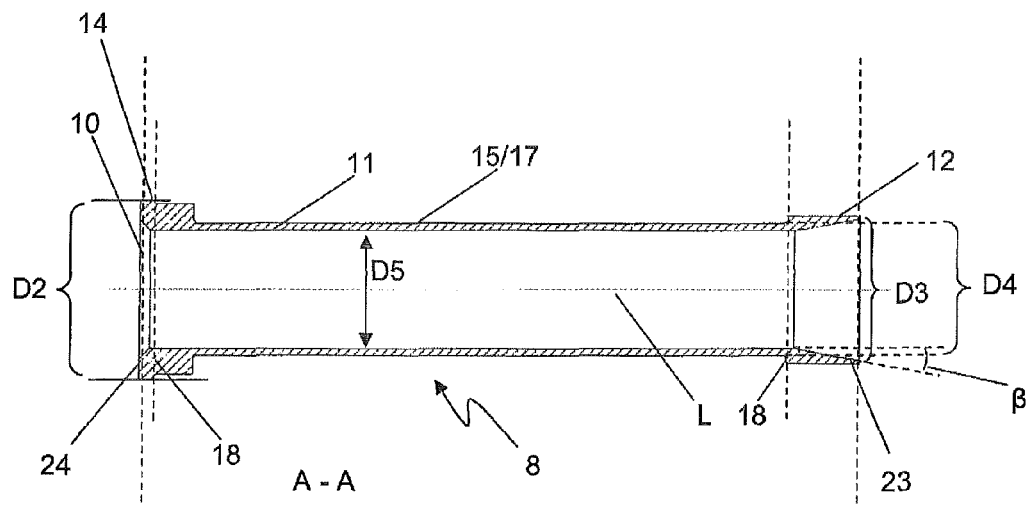
FIG. 7 is a cross-sectional view of the ferrule shown in FIG. 6 along line A-A.
Figure 8:
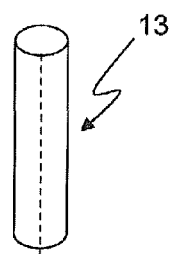
FIG. 8 shows an insulator made of insulating paper and designed as a ferrule.

The specific design of the ferrule 8 can in particular be seen in FIGS. 6 and 7. With respect to its overall shape, the ferrule 8 is essentially also designed as a hollow cylindrical body. The ferrule 8 comprises a support section 10 designed to comprise multiple tiers, the insulator section 11 and the support section 12, following each other in the aforesaid order, as regarded in the direction of flow a. The insulator section is designed to accommodate the thermal insulator 13, which in the present exemplary embodiment as shown in FIG. 8 is an insulating paper rolled to the shape of a ferrule. The thermal insulator 13 is clamped and held inside the straight tube 5 by the ferrule 8 in a manner described in more detail below.

In the support section 10, the ferrule 8 has a supporting collar 14 protruding outwardly in the radial direction. In this area the ferrule 8 has a diameter D2 which is larger than the inner diameter D3 of the straight tubes 5. Thus, when being inserted in the straight tube 5 on the face side, the ferrule 8 rests with its supporting collar 14 against the retaining plate 31 in the direction of insertion, so that further insertion in the straight tube 5 is impeded by way of this positive fit (FIG. 5). This allows for ensuring exact positioning of the ferrule 8 inside the straight tube 5 relatively to the inlet tubesheet 2a.

The insulator section 11 is, in the present exemplary embodiment of the ferrule 8, essentially characterized by an annular recess 15 extending along the outside circumference of the ferrule. Said recess extends around the ferrule 8 in the area between the support sections 10 and 12. In other words, the ferrule is designed in such a manner that, with respect to its outside jacket, it has an outer diameter D4 which is smaller than the inner diameter D3 of the straight tube 5. As a result, a defined cavity 17 in the shape of a hollow cylinder is obtained between the outside jacket surface of the ferrule 8 and the inside wall surface 16 of the straight tube 5. This cavity serves to accommodate the insulator 13, so that, as regarded in the outward radial direction starting from the longitudinal axis L of the straight tube 5 in the area of the tubesheet 2, the following structure is obtained: primary fluid—ferrule 8—insulator 13—straight tube 5—inlet tubesheet 2a. This is to illustrate that the heat transfer from the primary fluid towards the inlet tubesheet 2a is reduced by the insulator 13 throughout the thickness d2 of the inlet tubesheet 2a, so that thermal stress to the tubesheet 2 is considerably lowered in this area compared to prior art configurations.

As regarded in the direction of flow a, the insulator section 11 is finally followed by the further support section 12. In this area, the ferrule has a diameter D3 which corresponds to the inner diameter of the straight tube 5, so that the ferrule rests against the inside wall surface of the straight tube 5 in a positive or, depending on the embodiment, non-positive manner in this area. The support sections 10 and 12 thus delimit the cavity 17 upstream and downstream thereof by means of corresponding side walls 18.

On the one hand, the overall design of the ferrule 8 thus allows for it to be inserted in the interior of the tube 5 coming from the inlet side. The ferrule 8 can thus be inserted in the tube. On the other hand, the supporting collar 14 ensures that the ferrule 8 can be inserted in the straight tube 5 only to a certain extent. Another essential aspect of the invention is thus in particular the design of the two support sections 10 and 12 in the manner described above and illustrated in more detail by the drawings.

Another essential aspect regarding the design of the ferrule in section 12 is that it is designed such that its inside jacket surface is flattened or tapering towards the outside jacket surface in downstream direction towards the outer edge 23. As regarded in cross-section, the inside jacket surface of the ferrule thus forms an acute angle β with the outside jacket surface of the ferrule 8. As a result, the transition from the inner diameter D5 of the ferrule to the inner diameter D3 of the straight tube 5 does not occur abruptly but in a steady manner along the flattened or tapering area.

The cross-sectional view in FIG. 5 thus refers to the ferrule 8 when inserted in the tube together with the insulator 13 in an embodiment comprising the heat shield 19. As shown in FIG. 5, the ferrule 8 extends along the longitudinal axis L of the straight tube 5 in such a manner that, when inserted in the straight tube 5, it reaches from the upstream front face side of the heat shield 19 to the rear face side 9 of the inlet tubesheet.

The heat shield 19 almost completely eliminates the direct heat transfer from the primary fluid flowing against the front face side 7 of the tubesheet 2. Additionally, a direct heat transfer from the fluid flowing through the straight tube 5 to the straight tube is significantly reduced or even also virtually eliminated in this area by the thermal insulation device arranged inside the straight tubes at the level of the inlet tubesheet 2a. As a result, the thermal stress to the straight tube 5 is substantially reduced in the area of the inflowing fluid to be cooled and throughout the thickness of the inlet tubesheet 2a. This allows for reducing the admissible temperature of the straight tubes 5, so that eventually the straight tubes may be made of ferritic stainless steel, in particular of a grade as specified as particularly advantageous above, more specifically 1.4510 (DIN EN) or TP439 (ASME), even in the case of the fluid to be cooled (in particular heated cooling air of a cooler for gas turbine cooling air) having temperatures of more than 450° C. and up to a maximum of 550° C. These steels are characterized by more favorable (that is, smaller) coefficients of thermal expansion compared to austenitic steels as hitherto used in this connection, for example 1.4301 (DIN EN), and at the same time show a significantly higher resistance to SCC. As a result of this, so-called casing compensators can be completely dispensed with in the case of the cooler for gas turbine cooling air as shown in FIG. 3. These casing compensators, which were hitherto typically arranged in the area between the two tube bundle heat exchangers 1 and also in the area of the outlet air chamber 28, served to compensate for longitudinal stress within the cooler for gas turbine cooling air, which frequently resulted from the different coefficients of heat expansion of the materials used in particular for the pressure vessel and the straight tubes. The above described choice of materials for the straight tubes 5 and the pressure vessel reduces such longitudinal stresses to such an extent that casing compensators are no longer required. At the same time, a thermal relief of the straight tubes 5 and the inlet tubesheet 2a is achieved due to the specific design of the thermal insulation device and the heat shield, so that even primary fluids having inlet temperatures in the range of >450° C. and in particular >470° C. up to a maximum of 550° C. can be cooled successfully and permanently.

The invention claimed is:

1. A tube bundle heat exchanger having a straight-tube configuration, comprising:
   a pressure vessel having, in particular, a hollow cylindrical outer casing, an inlet tubesheet and an outlet tubesheet, which together define an interior space of the pressure vessel,
   a straight-tube bundle comprising a number of straight tubes each of said straight tubes having an inner diameter, which are arranged so as to open into said inlet tubesheet and said outlet tubesheet and which extend through said interior space of the pressure vessel;
   a primary inlet, via which a primary fluid to be cooled is guided to said inlet tubesheet and thence into said straight tube bundle, and an outlet, via which the cooled primary fluid coming from said straight tube bundle through said outlet tubesheet is discharged;
   a secondary inlet, via which a secondary fluid is fed into said interior space for cooling purposes, and a secondary outlet, via which said secondary fluid is discharged from said interior space, wherein said number of straight tubes of said tube bundle heat exchanger are made of a ferritic stainless steel, and that a thermal insulation device is arranged inside at least one of said number of straight tubes within the inlet tubesheet;
   wherein said thermal insulation device comprises a ferrule;
   wherein a first end of the ferrule includes a stop collar protruding radially outward and having a stop collar side wall perpendicular to a central longitudinal axis of the ferrule and a stop member diameter which is larger than the inner diameter of said at least one of said number of straight tubes;
   wherein a second end of the ferrule includes a support section having a support section side wall protruding radially outward and perpendicular to the central longitudinal axis of the ferrule;
   wherein said ferrule comprises an annular recess extending in an axial direction in the area between outer edges of said ferrule, said annular recess forming a receiving cavity defined by the stop collar side wall, the support section side wall, an outside jacket surface of said ferrule and an inside wall surface of said at least one of said number of straight tubes; and
   wherein an insulator is disposed within the receiving cavity, axial movement of the insulator along the receiving cavity being delimited by the stop collar side wall and the support section side wall.

2. The tube bundle heat exchanger according to claim 1, wherein said number of straight tubes are made of one of the following ferritic stainless high-grade steels: 1.4509 (DIN EN 10088-1:2005), 1.4510 (DIN EN 10088-1:2005), 1,4511 (DIN EN 10088-1:2005), 1.4512 (DINEN 10088-1:2005), 1.4513 (DINEN 10088-1:2005), 1.4520 (DINEN 10088-1: 2005), 1.4521 (DIN EN 10088-1:2005), 1.4607 (prEN 10088-2011), TP409 (ASME), TP439 (ASME) or TP444 (ASME).

3. The tube bundle heat exchanger according to claim 1, wherein the outer casing is made of an unalloyed steel, in particular P355 NH (DIN EN 10028-3), 15NiCuMoNb5-6-4 (DIN EN 10028-2), 20MnMoNi4-5 (DIN EN 10028-2), 13CrMo4-5 (DIN EN 10028-2), 10CrMo9-10 (DIN EN 10028-2), SA-516-Gr.71 (ASME), SA-302-Gr. B (ASME) or SA-533-Gr. B (ASME).

4. The tube bundle heat exchanger according to claim 1, wherein said ferrule is designed so as to taper towards at least one outer edge of said ferrule in the axial direction of the ferrule and to have an inner diameter which expands as regarded in the direction of flow.

5. The tube bundle heat exchanger according to claim 1, wherein said insulator is an insulation body which is fixed inside said at least one of said number of straight tubes by the ferrule, said insulation body in particular consisting of an insulating paper.

6. The tube bundle heat exchanger according to claim 1, wherein said insulator at least partially covers said inside wall surface of said at least one of said number of straight tubes.

7. The tube bundle heat exchanger according to claim 1, wherein a heat shield is arranged upstream of the inlet tubesheet as regarded in a direction of flow of the primary fluid.

8. The tube bundle heat exchanger according to claim 7, wherein said heat shield comprises passage openings which correspond to each of said number of straight tubes, and that said thermal insulation device is designed so as to extend from a side facing away from the inlet tubesheet up to a level of the inlet tubesheet.

9. The tube bundle heat exchanger according to claim 7, wherein said heat shield comprises a ceramic fiber panel.

10. The tube bundle heat exchanger according to claim 9, further comprising a holding device which is designed so as to fix said ceramic fiber panel in front of said inlet tubesheet, comprising in particular a plurality of holding brackets and/or retaining plates.

11. The tube bundle heat exchanger according to claim 10, wherein said plurality of holding brackets and/or retaining plates are arranged concentrically along inside surface of the outer casing.

12. The tube bundle heat exchanger according to claim 1, wherein the exchanger is designed for the cooling of cooling air for gas turbines in gas turbine power plants or gas and steam turbine power plants, in particular for the cooling of cooling air to be cooled and having inlet temperatures of at least 450° C. and in particular at least 470° C. and more particularly up to a maximum of 550° C.

* * * * *